(12) United States Patent
Shi et al.

(10) Patent No.: US 12,452,853 B2
(45) Date of Patent: Oct. 21, 2025

(54) METHODS AND SYSTEMS FOR DETERMINING CONTROL INFORMATION IN WIRELESS NETWORKS

(71) Applicant: ZTE Corporation, Guangdong (CN)

(72) Inventors: Jing Shi, Guangdong (CN); Peng Hao, Guangdong (CN); Shuaihua Kou, Guangdong (CN); Xingguang Wei, Guangdong (CN); Kai Xiao, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 18/521,623

(22) Filed: Nov. 28, 2023

(65) Prior Publication Data

US 2024/0098729 A1 Mar. 21, 2024

Related U.S. Application Data

(63) Continuation of application No. PCT/CN2021/140339, filed on Dec. 22, 2021.

(51) Int. Cl.
*H04W 72/12* (2023.01)
*H04W 72/232* (2023.01)
*H04W 72/51* (2023.01)

(52) U.S. Cl.
CPC ......... *H04W 72/12* (2013.01); *H04W 72/232* (2023.01); *H04W 72/51* (2023.01)

(58) Field of Classification Search
CPC ... H04W 72/12; H04W 72/232; H04W 72/51; H04W 72/23; H04L 5/0053; H04L 5/0094
See application file for complete search history.

(56) References Cited

U.S. PATENT DOCUMENTS

| 2020/0229098 | A1* | 7/2020 | Cheng | H04W 52/0248 |
| 2020/0328840 | A1 | 10/2020 | Salah et al. | |
| 2022/0408458 | A1* | 12/2022 | MolavianJazi | H04W 72/0453 |
| 2022/0408464 | A1* | 12/2022 | MolavianJazi | H04W 72/0453 |
| 2023/0034987 | A1* | 2/2023 | Yi | H04L 5/0091 |

(Continued)

FOREIGN PATENT DOCUMENTS

| CN | 107734706 A | 2/2018 |
| CN | 111684852 A | 9/2020 |

(Continued)

OTHER PUBLICATIONS

International Search Report and Written Opinion for International Application No. PCT/CN2021/140339, mailed on Sep. 22, 2022 (6 pages).

(Continued)

*Primary Examiner* — Kevin T Bates
*Assistant Examiner* — Ayodele Lawrence Olubodun
(74) *Attorney, Agent, or Firm* — Perkins Coie LLP

(57) ABSTRACT

Methods and systems for techniques for determining control message formats in wireless networks are disclosed. In an implementation, a method of wireless communication includes determining, by a wireless device, a size budget of a control information in a case that the control information includes multi-cell scheduling control information, and monitoring a plurality of control channels carrying the control information within the size budget.

18 Claims, 3 Drawing Sheets

(56) References Cited

U.S. PATENT DOCUMENTS

| | | | |
|---|---|---|---|
| 2023/0057605 A1* | 2/2023 | MolavianJazi | H04L 5/0053 |
| 2023/0085896 A1* | 3/2023 | Takeda | H04W 24/08 |
| 2023/0129120 A1* | 4/2023 | MolavianJazi | H04L 1/1887 |
| | | | 370/329 |
| 2023/0139269 A1* | 5/2023 | MolavianJazi | H04L 5/0094 |
| | | | 370/329 |
| 2023/0144002 A1* | 5/2023 | Kim | H04L 5/001 |
| | | | 370/329 |

FOREIGN PATENT DOCUMENTS

| | | |
|---|---|---|
| CN | 112088566 A | 12/2020 |
| WO | 2020/211768 A1 | 10/2020 |
| WO | 2020255531 A1 | 12/2020 |
| WO | 2021151237 A1 | 8/2021 |
| WO | 2021/206921 A1 | 10/2021 |

OTHER PUBLICATIONS

EPO, Extended European Search Report for European Application No. 21 968 519.5, mailed on Nov. 26, 2024, 9 pages.

ZTE, "Discussion on Multi-cell PDSCH Scheduling via a Single DCI," 3GPP TSG RAN WG1 #105-e, e-Meeting, R1-2104341, May 10-27, 2021, 20 pages.

* cited by examiner

METHODS AND SYSTEMS FOR DETERMINING CONTROL INFORMATION IN WIRELESS NETWORKS

CROSS-REFERENCE TO RELATED APPLICATIONS

This application is a continuation of International Patent Application No. PCT/CN2021/140339, filed on Dec. 22, 2021, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for determining control message formats in wireless networks.

In one aspect, a method of data communication is disclosed. The method includes determining, by a wireless device, a size budget of a control information in a case that the control information includes multi-cell scheduling control information, and monitoring a plurality of control channels carrying the control information within the size budget.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

Figure 1:
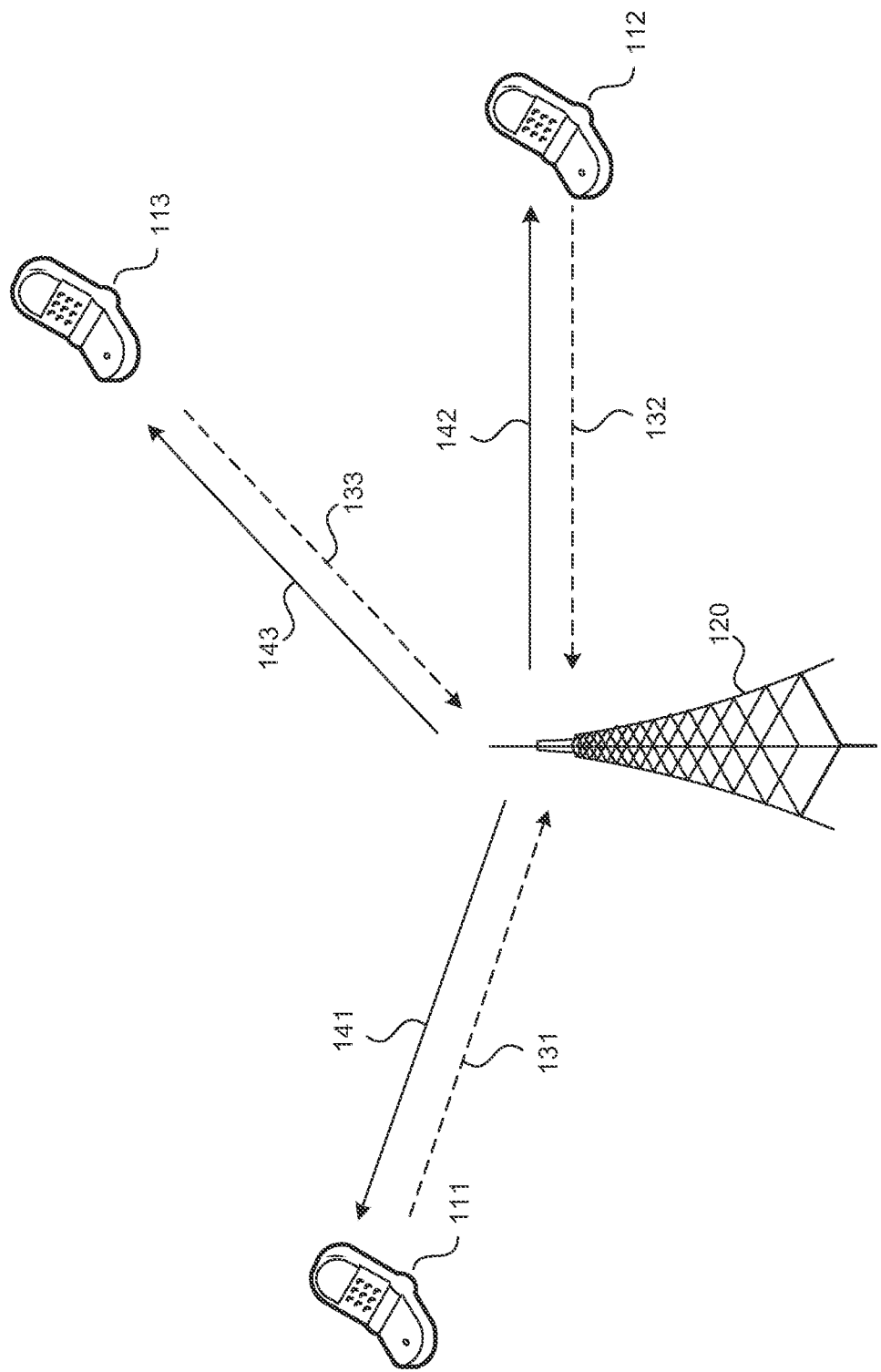
FIG. 1 shows an example of a wireless communication system based on some example embodiments of the disclosed technology.

FIG. 1 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

Figure 2:
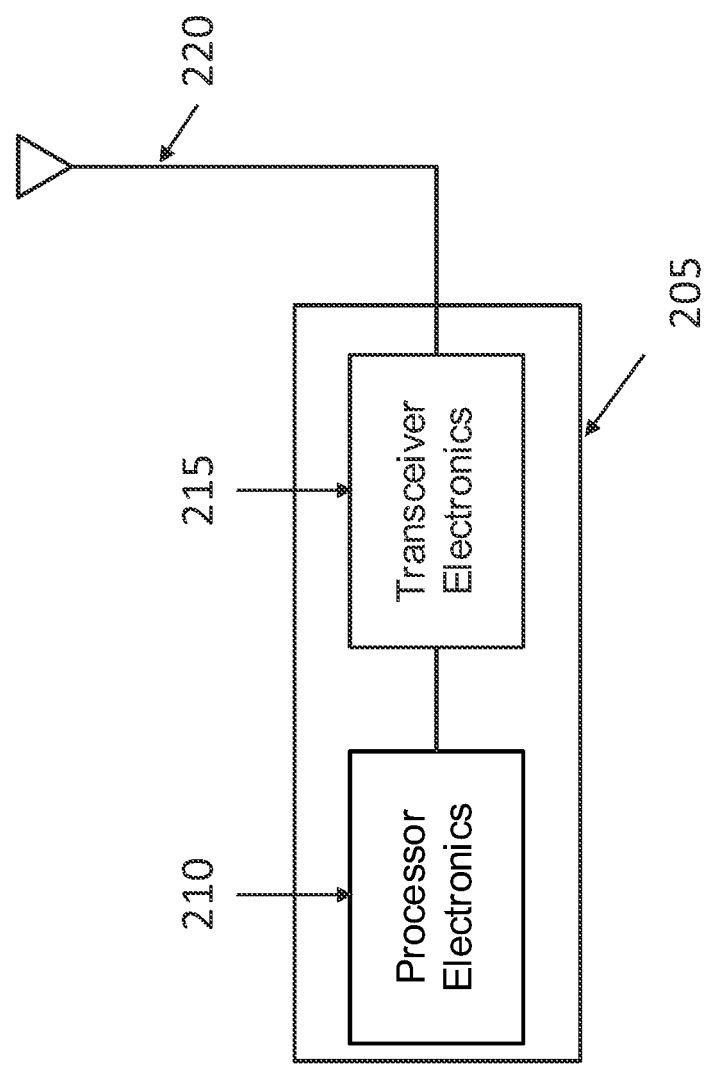
FIG. 2 is a block diagram representation of a portion of an apparatus based on some embodiments of the disclosed technology.

FIG. 2 is a block diagram representation of a portion of an apparatus based on some embodiments of the disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

The 4th Generation mobile communication technology (4G) Long-Term Evolution (LTE) or LTE-Advance (LTE-A) and the 5th Generation mobile communication technology (5G) face more and more demands. Based on the current development trend, 4G and 5G systems are developing supports on features of enhanced mobile broadband (eMBB), ultra-reliable low-latency communication (URLLC), and massive machine-type communication (mMTC). In addition, Carrier Aggregation (CA) can be used in both the 4G and 5G communication systems.

In the current carrier aggregation (CA) techniques, scheduling mechanism only allows scheduling of single-cell physical uplink shared channel (PUSCH)/physical downlink shared channel (PDSCH) per a scheduling DCI. With more available scattered spectrum bands, the need of simultaneous scheduling of multiple cells is expected to be increasing. To reduce the control overhead, it is beneficial to extend from single-cell scheduling to multi-cell PUSCH/PDSCH scheduling with a single scheduling downlink control information (DCI). Optionally, the multi-cell PUSCH/PDSCH scheduling is restricted to one PUSCH/PDSCH on one cell.

When multi-cell PUSCH/PDSCH scheduling with a single scheduling DCI is introduced, since DCI size budget is defined for one scheduled cell, how and whether multi-cell scheduling DCI can be applied to the size budget should be determined.

Embodiment 1

DCI size budget: A UE expects to monitor physical downlink control channel (PDCCH) candidates for up to 4 sizes of DCI formats that include up to 3 sizes of DCI formats with CRC scrambled by C-RNTI per serving cell. This DCI size budget can be referred to as budget "3+1."

The disclosed technology can be implemented in some embodiments to determine how and whether multi-cell scheduling DCI can be applied to the size budget in a carrier aggregation scenario where multi-cell PUSCH/PDSCH scheduling with a single scheduling DCI is introduced, and DCI size budget is defined for one scheduled cell.

Method 1: the multi-cell scheduling DCI is not counted in the current per cell budget "3+1." A single cell scheduling with legacy DCI formats is also workable in the same way as a legacy scheme such as Rel-15 specification. The multi-cell scheduling DCI is a new format and not involved in the current per cell budget "3+1," which can be a new UE capability.

Additionally, method 1 can be similarly used for BD/CCE budget. Since legacy BD/CCE budget for PDCCH monitoring is also defined per scheduled cell, when multi-cell PUSCH/PDSCH scheduling with a single scheduling DCI is introduced, the PDCCH monitoring for the multi-cell scheduling DCI is not counted in the current per cell BD/CCE budget, which can be a new UE capability.

Method 2: the multi-cell scheduling DCI is included in the current per cell budget "3+1" and is not counted/included in the "up to 3 sizes" of DCI formats with CRC scrambled by C-RNTI per serving/scheduled cell. Although the multi-cell scheduling DCI is a format with CRC scrambled by C-RNTI, it is counted in "other RNTI." The method can further include one of the following alternatives below.

Alternative 1: in some implementations, Format 0_3 is defined for multi-cell PUSCH scheduling, Format 1_3 is defined for multi-cell PDSCH scheduling, Format 0_3 and 1_3 are always size aligned, or aligned if the total number of different DCI sizes configured to monitor is more than 4 for the cell.

Alternative 2: in some implementations, Format 2_x is defined for multi-cell scheduling for both PDSCH and PUSCH scheduling in one DCI. The total number of different DCI sizes UE is configured to monitor does not exceed 4 for the cell.

In this way, only one size is determined for one DCI format. There are no changes in the size alignment for the current per cell budget, thereby simplifying the UE implementation and the complexity of the specification. The multi-cell DCI format can be another UE capability, or is not counted in the up to 3 sizes of DCI formats with CRC scrambled by C-RNTI per serving cell, avoiding modification on size alignment steps and keeping the total number of different DCI sizes with C-RNTI configured to monitor so that the total number does not exceed 3 for the cell.

Embodiment 2

DCI size budget: a UE expects to monitor PDCCH candidates for up to 4 sizes of DCI formats that include up to 3 sizes of DCI formats with CRC scrambled by C-RNTI per serving cell. This DCI size budget can be referred to as budget "3+1."

The disclosed technology can be implemented in some embodiments to determine how and whether multi-cell scheduling DCI can be applied to the size budget in a carrier aggregation scenario where multi-cell PUSCH/PDSCH scheduling with a single scheduling DCI is introduced, and DCI size budget is defined for one scheduled cell.

If two-stage DCI is used for multi-cell scheduling, 1st DCI (first control information) is used only for the first PDSCH and 2nd DCI (second control information) in the first PDSCH is used to schedule other PDSCHs. UE blind decoding complexity is the same as that of a single cell, and DCI formats can be regarded as the same as a legacy per scheduled cell. That is, DCI size budget can be the same as the legacy per scheduled cell, only for the 1st DCI. The 2nd DCI for other PDSCHs is similar to UCI multiplexing in PUSCH, which can be regarded as DCI multiplexing in PDSCH.

The disclosed technology can be implemented in some embodiments to allow UE to know UE there is 2nd DCI and to determine the size of 2nd DCI within this two-stage DCI.

Method 1: the 1st DCI is the same as a legacy DCI format (e.g., format 1_1) with one additional field to indicate whether there is the 2nd DCI in the PDSCH. In addition, the size of 2nd DCI is always determined by the maximum number/size of cells that can be scheduled.

For example, the UE detects a DCI format 1_1 and an additional field that indicates there is the 2nd DCI in the PDSCH. In a case that the maximum number of cells configured with multi-cell scheduling is 8 cells, the 2nd DCI in the PDSCH includes additional 7 PDSCHs on the corresponding cells. The detailed cells can be indicated by each carrier indicator field (CIF) indicator, and the size of 2nd DCI is calculated by the configurations on the additional 7 cells. If the number of the actual scheduled PDSCHs is less than 7, the size is always determined by the maximum number/size of cells that can be scheduled, and is configured by a higher layer signaling or is predefined. Additionally, the 1st DCI can also provide beta-offset for the 2nd DCI to derive a different code rate.

Method 2: the 1st DCI is the same as a legacy DCI format (e.g., format 1_1) with one additional field to indicate the number/size of cells of the 2nd DCI in the PDSCH.

For example, the UE detects a DCI format 1_1 and an additional field that indicates the number/size of cells of the 2nd DCI format in the PDSCH. In a case that the maximum number of cells configured with multi-cell scheduling is 8 cells, and the 1st DCI indicates there are 3 cells in the 2nd DCI, that information is in the PDSCH scheduled by the 1st DCI and includes scheduling information for additional 3 PDSCHs on the corresponding cells. The detailed cells can be indicated by each CIF indicator, and the size of 2nd DCI is calculated by the configurations on the 3 cells, which lead to the maximum DCI size. If the actual size for the scheduled 3 PDSCHs is less than the above, the padding bits are expected. Additionally, the 1st DCI can also provide beta-offset for the 2nd DCI to derive a different code rate.

Method 3: the 1st DCI is the same as a legacy DCI format (e.g., format 1_1) with one additional field to indicate the detailed cell indices/code-points. In this case, the size of the 2nd DCI can be indirectly determined or derived from other values.

For example, the UE detects a DCI format 1_1 and an additional field that indicates the number/size of cells of the 2nd DCI format in the PDSCH. In a case that the maximum number of cells configured with multi-cell scheduling is 8 cells, and the 1st DCI indicates there are cell #2,3,5 in the 2nd DCI, that information is in the PDSCH scheduled by the 1st DCI and includes scheduling information for additional 3 PDSCHs on the corresponding cells. The details about the cells can be indicated by each CIF indicator, and the size of 2nd DCI is calculated by the configurations on the cell #2,3,5. Additionally, the 1st DCI can also provide beta-offset for the 2nd DCI to derive a different code rate.

Method 4: the disclosed technology can be implemented to combine two or more of the methods 1-3 above. In addition, the one or more fields in the 2nd DCI can be a shared indication for all scheduled cells or a group scheduled cells.

For example, the UE detects a DCI format 1_1 and an additional field that indicates the number/size of cells of the 2nd DCI format in the PDSCH. In a case that the maximum number of cells configured with multi-cell scheduling is 8 cells, and the 1st DCI indicates there are cell #1-7 in the 2nd DCI, that information is in the PDSCH scheduled by the 1st DCI and includes scheduling information for another 7 PDSCHs on the corresponding cells. The details about the cells can be indicated by each CIF indicator, and the size of 2nd DCI is calculated by the configurations on the cell #1-7. In the 2nd DCI, one or more fields in the 2nd DCI can be a shared indication for all scheduled cells or a group scheduled cells. For example, frequency domain resource assignment (FDRA) field is a shared indication for all the 7 scheduled cells, or the 7 scheduled cells are divided into 4 groups, and each group includes 2,2,2,1 cells, FDRA fields, which are separate indications among groups, and a shared indication for the cells in a group. Additionally, the 1st DCI can also provide beta-offset for the 2nd DCI to derive a different code rate.

Method 5: the disclosed technology can be implemented to combine two or more of the methods 1-4 above. In addition, the 2nd DCI is only present when the 1st DCI is scheduled without DL-SCH transmission. In this case, the size of the 2nd DCI can be indirectly determined or derived from other values.

For example, the UE detects a DCI format 1_1 and an additional field that indicates the number/size of cells of the 2nd DCI format in the PDSCH. In a case that the maximum number of cells configured with multi-cell scheduling is 8 cells, and the 1st DCI indicates there are cell #2,3,5 in the 2nd DCI, that information is in the PDSCH scheduled by the 1st DCI and includes scheduling information for another 3 PDSCHs on the corresponding cells. In addition, the 1st DCI scheduled no DL-SCH transmission. The details about the cells can be indicated by each CIF indicator, and the size of 2nd DCI is calculated by the configurations on the cell #2,3,5. That is, the PDSCH scheduled by 1st DCI only includes the 2nd DCI, thereby avoiding DCI multiplexing on PDSCH.

In this way, only one size is determined for one DCI format by the methods of this embodiment. There are no changes in the size alignment for the current per cell budget, thereby simplifying the UE implementation and the complexity of the specification. The multi-cell DCI format is a two-stage DCI format and the 1st DCI is a legacy DCI format, which is counted in the up to 3 sizes of DCI formats with CRC scrambled by C-RNTI per serving cell. The remaining issues are only to address whether there is 2nd DCI in the scheduled PDSCH and the size of the 2nd DCI. In addition, the 2nd DCI is not related to DCI size budget.

Embodiment 3

DCI size budget: A UE expects to monitor PDCCH candidates for up to 4 sizes of DCI formats that include up to 3 sizes of DCI formats with CRC scrambled by C-RNTI per serving cell. This DCI size budget can be referred to as budget "3+1."

The disclosed technology can be implemented in some embodiments to determine how and whether multi-cell scheduling DCI can be applied to the size budget in a carrier aggregation scenario where multi-cell PUSCH/PDSCH scheduling with a single scheduling DCI is introduced, and DCI size budget is defined for one scheduled cell.

If two-stage DCI is used for multi-cell scheduling, 1st DCI only for the first PDSCH and 2nd DCI in the first PDSCH to scheduling other PDSCHs. UE blind decoding complexity is the same as that of a single CC, and DCI formats can be regarded as the same as a legacy per scheduled cell. That is, DCI size budget can be the same as the legacy per scheduled cell, only for the 1st DCI. The 2nd DCI for other PDSCHs is similar to UCI multiplexing in PUSCH, which can be regarded as DCI multiplexing in PDSCH.

The disclosed technology can be implemented in some embodiments to schedule multi-cell PUSCH within this two-stage DCI.

Method 1: the UL grant for other PUSCHs is in the first PDSCH scheduled by 1st DCI, and another bit field for indicating DL/UL flag is introduced in the 1st DCI.

For example, the UE detects a DCI format 1_1 and an additional field that indicates the 2nd DCI is DL assignment or UL grant. The size of 2nd DCI is always determined by the maximum number/size of cells that can be scheduled, or the cells indicated by the 1st DCI. The UL grant for other PUSCHs is in the first PDSCH scheduled by 1st DCI, and another bit field for indicating DL/UL flag is introduced in the 1st DCI. Compared with the above PDSCH scheduling, one addition cell is needed within the same maximum cell number configured for multi-cell PDSCH/PUSCH scheduling. In a case that the maximum number of cells configured with multi-cell scheduling is 8 cells, the 2nd DCI in the PDSCH may include additional 8 PUSCHs on the corresponding cells. The details about the cells can be indicated by each CIF indicator, and the size of 2nd DCI for scheduling multi-cell PUSCHs is calculated by the configurations on the additional 8 cells or the actual scheduled cells. If the number of the actually scheduled PUSCHs is less than 8, the size is always determined by the maximum number/size of cells that can be scheduled, and is configured by a higher layer signaling or is predefined, or the size is determined by the actually scheduled cells. Additionally, the 1st DCI can also provide beta-offset for the 2nd DCI to derive a different code rate.

Method 2: DL/UL mixed scheduling. 2nd DCI in the PDSCH could comprise scheduling information of PDSCHs and PUSCHs.

For example, the UE detects a DCI format 1_1 and an additional field that indicates the cell number/indices or size of the 2nd DCI. The size of 2nd DCI is always determined by the maximum number/size of cells that can be scheduled, or the cells indicated by the 1st DCI. 2nd DCI in the PDSCH scheduled by the 1st DCI may include scheduling information of PDSCHs and PUSCHs. Each DCI in the 2nd DCI includes DL/UL flag. In a case that the maximum number of cells configured with multi-cell scheduling is 8 cells, then the 2nd DCI in the PDSCH may include additionally up to 8 PUSCHs and 7 PDSCHs on the corresponding cells, or up to 7 or 8 cells regardless of PDSCH or PUSCH. The details about the cells can be indicated by each CIF indicator, and the size of 2nd DCI for scheduling multi-cell PUSCHs is calculated by the configurations on the additional 8 cells or the actual scheduled cells. If the actual scheduled PUSCHs is less than 8, the size is always determined by the maximum number/size of cells that can be scheduled, and is configured by a higher layer signaling or is predefined, or the size is determined by the actual scheduled cells. Additionally, the 1st DCI can also provide beta-offset for the 2nd DCI to derive a different code rate.

Method 3: unlike PDSCH scheduling, 2nd DCI for scheduling multi-cell PUSCH in the PDSCH is only combined with no DL-SCH scheduling, and DL/UL flag is not needed.

For example, the UE detects a DCI format 1_1 and optionally an additional field that indicates the cell number/indices or the size of the 2nd DCI. The size of 2nd DCI is always determined by the maximum number/size of cells that can be scheduled, or the cells indicated by the 1st DCI. 2nd DCI in the PDSCH scheduled by the 1st DCI may include scheduling information of PUSCHs in a case that the PDSCH scheduled by 1st DCI is not a DL-SCH transmission. Each DCI in the 2nd DCI does not include DL/UL flag. In a case that the maximum number of cells configured with multi-cell scheduling is 8 cells, then the 2nd DCI in the PDSCH may include additionally up to 8 PUSCHs on the corresponding cells. The details about the cells can be indicated by each CIF indicator, and the size of 2nd DCI for scheduling multi-cell PUSCHs is calculated by the configurations on the additional 8 cells or the actually scheduled cells. If the actual scheduled PUSCHs is less than 8, the size is always determined by the maximum number/size of cells that can be scheduled and is configured by a higher layer signaling or predefined, or the size is determined by the actual scheduled cells. Additionally, the 1st DCI can also provide beta-offset for the 2nd DCI to derive a different code rate.

Method 4: decouple with PDSCH scheduling. 2nd DCI for scheduling multi-cell PDSCH/PUSCH in the PDSCH only combined with no DL-SCH scheduling, and DL/UL flag is needed in each 2nd DCI.

For example, the UE detects a DCI format 1_1 and optionally an additional field that indicates the cell number/indices or size of the 2nd DCI. The size of 2nd DCI is always determined by the maximum cells/size that can be scheduled, or the cells indicated by the 1st DCI. 2nd DCI in the PDSCH scheduled by the 1st DCI may include scheduling information of PUSCHs and/or PDSCHs in case the PDSCH scheduled by 1st DCI is no DL-SCH transmission. Each DCI in the 2nd DCI comprises DL/UL flag. In a case that the maximum number of cells configured with multi-cell scheduling is 8 cells, then the 2nd DCI in the PDSCH could comprise another up to 8 PUSCHs and 7 PDSCHs on the corresponding cells, or up to 7 or 8 cells regardless of PDSCH or PUSCH. The details about the cells can be indicated by each CIF indicator, and the size of 2nd DCI for scheduling multi-cell PUSCHs is calculated by the configurations on the additional 8 cells or the actually scheduled cells. If the actually scheduled PUSCHs is less than 8, the size is always determined by the maximum number/size of cells that can be scheduled, and is configured by higher layer signaling or predefined, or the size is determined by the actual scheduled cells. Additionally, the 1st DCI can also provide beta-offset for the 2nd DCI to derive a different code rate.

Method 5: 1st DCI is used to schedule multicast/broadcast with CRC scrambled by G-RNTI, and 2nd DCI can be used for a scheduling by each UE or a group of UEs.

For example, the UE detects a DCI format 1_1 with CRC scrambled by G-RNTI and optionally an additional field to indicate the cell number/indices or size of the 2nd DCI. The size of 2nd DCI is always determined by the maximum cells/size that can be scheduled, or the cells indicated by the 1st DCI. 2nd DCI in the PDSCH scheduled by the 1st DCI could comprise scheduling information of PDSCHs for different multicast/broadcast traffic or for different UE/a group of UE. Assume maximum cells that multi-cell scheduling is configured 8 cells, then the 2nd DCI in the PDSCH could comprise another up to 7 PDSCHs on the corresponding cells. The detailed cells can be indicated by each CIF indicator, and the size of 2nd DCI for scheduling multi-cell PDSCHs is calculated by the configurations on the additional 8 cells or the actual scheduled cells. If the actually scheduled PDSCHs is less than 8, the size is always determined by the maximum number/size of cells that can be scheduled, and is configured by a higher layer signaling or predefined, or the size is determined by the actual scheduled cells. Additionally, the 1st DCI can also provide beta-offset for the 2nd DCI to derive a different code rate.

Method 6: 1st DCI is used to indicate the information on CORESET or a search space for the 2nd DCI.

For example, the UE detects a DCI format 1_1 with CRC scrambled by G-RNTI and optionally additional field(s) to indicate the monitored candidate or CORESET/Search space of the 2nd DCI. 2nd DCI in the indicated monitoring location does not need blind decoding. In a case that the maximum number of cells configured with multi-cell scheduling is 8 cells, the 2nd DCI in the indicated monitoring location may include additionally up to 7 PDSCHs on the corresponding cells. The details about the cells can be indicated by each CIF indicator, and the size of 2nd DCI for scheduling multi-cell PDSCHs is calculated by the configurations on the additional 8 cells or the actual scheduled cells. If the actual scheduled PDSCHs is less than 8, the size is always determined by the maximum number/size of cells that can be scheduled, and is configured by a higher layer signaling or is predefined, or the size is determined by the actual scheduled cells.

Method 7: within the two-stage DCI, 1st DCI is used only for the first PDSCH and 2nd DCI in the first PDSCH is used to schedule other PDSCHs/PUSCHs. K0 (scheduling offset between PDCCH and PDSCH)/K2 (scheduling offset between PDCCH and PUSCH) in the 2nd DCI can be based on 1st DCI or the first PDSCH.

For example, the UE detects a DCI format 1_1 and an additional field that indicates there is the 2nd DCI in the PDSCH or the cell number/indices for the 2nd DCI. In a case that the maximum number of cells configured with multi-cell scheduling is 8 cells, then the 2nd DCI in the PDSCH includes additionally up to 7 PDSCHs on the corresponding cells. The details about the cells can be indicated by each CIF indicator. In the 2nd DCI, the K0 in each DCI for scheduling one PDSCH on one cell is based on 1st DCI or the first PDSCH, which means the start of K0 is counted from the 1st DCI or the first PDSCH scheduled by the 1st DCI. Alternatively, in the 2nd DCI, the K0 in each DCI for scheduling a group of PDSCH on multi-cells is based on 1st DCI or the first PDSCH, which means the start of K0 is counted from the 1st DCI or the first PDSCH scheduled by the 1st DCI.

For example, the UE detects a DCI format 1_1 and an additional field that indicates there is the 2nd DCI in the PDSCH or the cell number/indices for the 2nd DCI. In a case that the maximum number of cells configured with multi-cell scheduling is 8 cells, then the 2nd DCI in the PDSCH includes additionally up to 8 PUSCHs on the corresponding cells, or up to 8 PDSCHs/PUSCHs on the corresponding cells. The details about the cells can be indicated by each CIF indicator. In the 2nd DCI, the K2 in each DCI for scheduling one PUSCH on one cell is based on 1st DCI or the first PDSCH, which means the start of K2 is counted from the 1st DCI or the first PDSCH scheduled by the 1st DCI. Alternatively, in the 2nd DCI, the K2 in each DCI for scheduling a group of PUSCH on multi-cells, is based on 1st DCI or the first PDSCH, which means the start of K0 is counted from the 1st DCI or the first PDSCH scheduled by the 1st DCI.

In this way, only one size is determined for one DCI format by the methods of this embodiment. There are no changes in the size alignment for the current per cell budget, thereby simplifying the UE implementation and the complexity of the specification. The multi-cell DCI format is two-stage DCI and the 1st DCI is a legacy DCI format, which is counted in the up to 3 sizes of DCI formats with CRC scrambled by C-RNTI per serving cell. The remaining issues are only to address multi-cell PUSCH scheduling by the 2nd DCI in the scheduled PDSCH. Additionally, the 2nd DCI is not related to DCI size budget.

The disclosed technology can be implemented in some embodiments to determine how and whether multi-cell scheduling DCI (single DCI) can be applied to the size budget. In some implementations, R18 multi-cell scheduling DCI is a new format and is not involved in the current "3+1" per cell budget, which is a new UE capability, and additionally, similar to BD budget per scheduled cell. In some implementations, the multi-cell scheduling DCI is included in the current per cell budget "3+1," although the multi-cell scheduling DCI format with CRC scrambled by C-RNTI is counted in "other RNTI."

The disclosed technology can be implemented in some embodiments to allow the UE to know there is 2nd DCI and determine the size of 2nd DCI, if 1st DCI is only for the first PDSCH and 2nd DCI is in the first PDSCH to schedule other PDSCHs. In some implementations, the 1st DCI is the same as a legacy DCI format (e.g., format 1_1) with one additional field to indicate whether there is the 2nd DCI in the PDSCH. In some implementations, the 1st DCI is the same as a legacy DCI format (e.g., format 1_1) with one additional field to indicate the number/size of cells of the 2nd DCI in the PDSCH. In some implementations, the 1st DCI is the same as a legacy DCI format (e.g., format 1_1) with one additional field to indicate the detailed cell indices/codepoints. In some implementations, the methods discussed above can be combined. The one or more fields in the 2nd DCI can be a shared indication for all scheduled cells or a group scheduled cells. In some implementations, the methods discussed above can be combined. The 2nd DCI is only present when the 1st DCI is scheduled without DL-SCH transmission.

The disclosed technology can be implemented in some embodiments to schedule multi-PUSCH, if 1st DCI is used only for the first PDSCH and 2nd DCI in the first PDSCH is used to schedule other PDSCHs. In some implementations, the UL grant for other PUSCHs is also in the first PDSCH. In this case, another bit field for indicating DL/UL flag is introduced in the 1st DCI. In some implementations, DL/UL mixed scheduling is used. Each DCI in the 2nd DCI includes DL/UL flag. In some implementations, 2nd DCI in the PDSCH is only combined with no DL-SCH scheduling. In some implementations, 2nd DCI for scheduling multi-cell PDSCH/PUSCH in the PDSCH is only combined with no DL-SCH scheduling, and DL/UL flag is needed in each 2nd DCI. In some implementations, 1st DCI is used to schedule multicast/broadcast with CRC scrambled by G-RNTI, and 2nd DCI can be used for scheduling by each UE or a group of UEs. In some implementations, 1st DCI is used to indicate the information on CORESET or Search space for the 2nd DCI. In some implementations, within this two-stage DCI, 1st DCI is used only for the first PDSCH and 2nd DCI in the first PDSCH is used to schedule other PDSCHs/PUSCHs. K0/K2 in the 2nd DCI can be based on 1st DCI or the first PDSCH.

Figure 3:
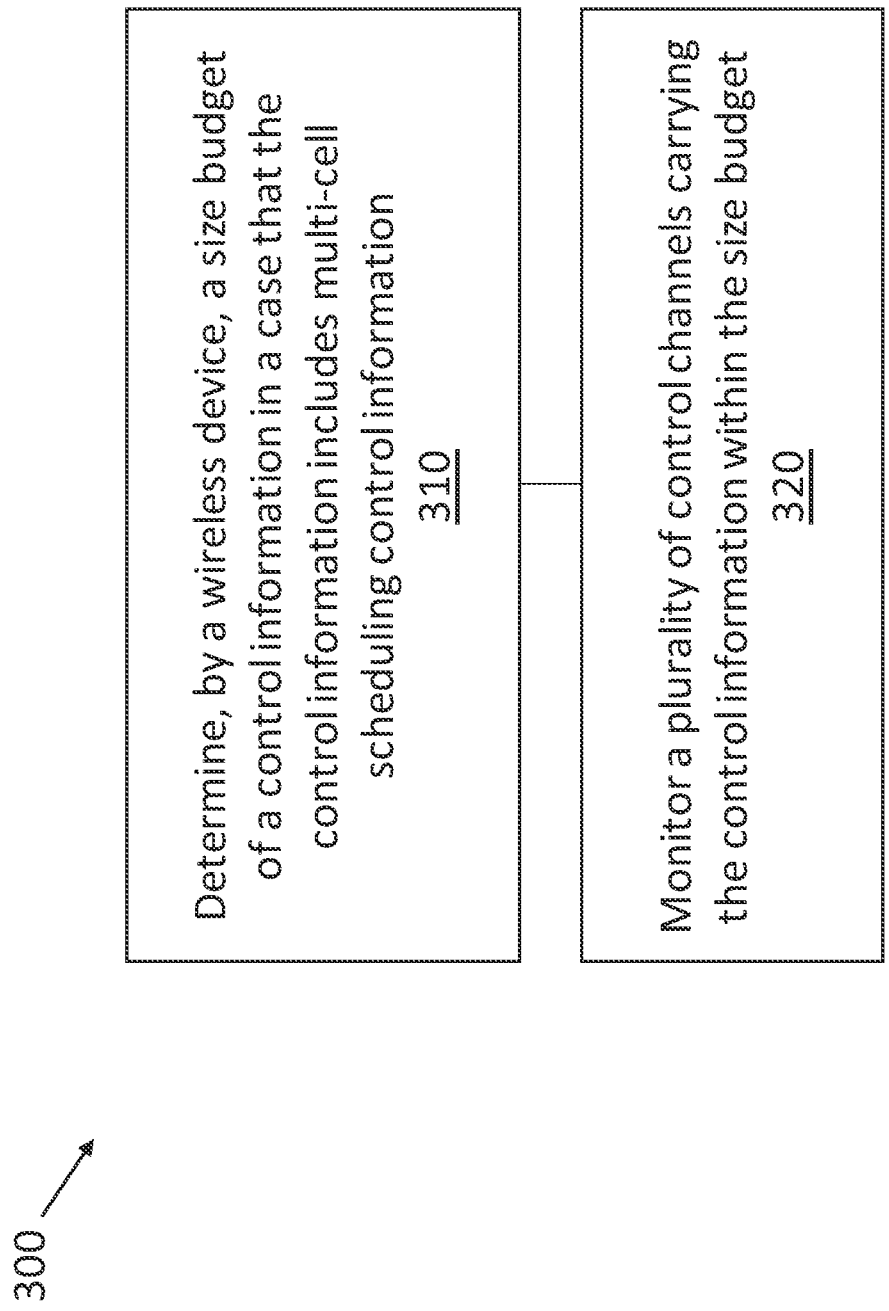
FIG. 3 shows an example of a process for wireless communication based on some example embodiments of the disclosed technology.

FIG. 3 shows an example of a process for wireless communication based on some example embodiments of the disclosed technology.

In some implementations, the process 300 for wireless communication may include, at 310, determining, by a wireless device, a size budget of a control information in a case that the control information includes multi-cell scheduling control information, and at 320 monitoring a plurality of control channels carrying the control information within the size budget.

In one example, the control information a plurality of downlink control information (DCI) formats. In one example, the multi-cell scheduling control information includes a first control information for scheduling a first physical downlink shared channel (PDSCH) on one cell and a second control information that is in the PDSCH to schedule at least one of PDSCHs and PUSCHs on other cells.

It will be appreciated that the present document discloses techniques that can be embodied in various embodiments to determine downlink control information in wireless networks. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the embodiments above and throughout this document. As used in the clauses below and in the claims, a wireless device may be user equipment, mobile station, or any other wireless terminal including fixed nodes such as base stations. A network device includes a base station including a next generation Node B (gNB), enhanced Node B (eNB), or any other device that performs as a base station.

Clause 1. A method of wireless communication, comprising determining, by a wireless device, a size budget of a control information in a case that the control information includes multi-cell scheduling control information; and monitoring a plurality of control channels carrying the control information within the size budget.

Clause 2. The method of clause 1, wherein the control information includes multiple downlink control information (DCI) formats, and wherein the DCI formats include a baseline DCI size budget that includes up to three different DCI sizes using cell radio network temporary identifier (C-RNTI) and up to four different DCI sizes using any RNTI.

Clause 3. The method of clause 2, wherein a DCI format of the multiple DCI formats used for multi-cell scheduling is not included in the baseline DCI size budget.

Clause 4. The method of clause 3, wherein the size of the DCI format used for multi-cell scheduling is counted as a new wireless device capability.

Clause 5. The method of clause 2, wherein a DCI format of the multiple DCI formats used for multi-cell scheduling is included in the baseline DCI size budget, and wherein the size of multi-cell scheduling control information is not included in the up to three different DCI sizes using C-RNTI. In some implementations, the size of multi-cell scheduling control information can be included in the up to three different DCI sizes using C-RNTI if the total DCI sizes of all the DCI formats with CRC scrambled C-RNTI do not exceed three. The size of multi-cell scheduling control information is not included in the up to three different DCI sizes using C-RNTI if the total DCI sizes of all the DCI formats with CRC scrambled C-RNTI exceed three.

Clause 6. The method of clause 1, wherein the multi-cell scheduling control information includes a first control information for scheduling a first physical downlink shared channel (PDSCH) on one cell and a second control information that is in the PDSCH to schedule at least one of PDSCHs and PUSCHs on one or more other cells.

Clause 7. The method of clause 6, wherein the first control information includes an indication field for indicating whether the second control information is in the first PDSCH.

Clause 8. The method of clause 6, wherein the first control information includes an indication field for indicating a number of cells corresponding to the second control information that is in the first PDSCH.

Clause 9. The method of clause 6, wherein the first control information includes an indication field for indicating each cell index or a code point for a group of cells.

Clause 10. The method of clause 6, wherein the second control information includes one or more shared indication fields for all scheduled cells or a group of scheduled cells.

Clause 11. The method of clause 6, wherein the second control information is present only when the first PDSCH is scheduled without downlink shared channel (DL-SCH) transmission.

Clause 12. The method of clause 6, wherein the second control information is uplink (UL) grant or downlink (DL) assignment, and wherein the first control information includes an indication field that indicates the second control information is an uplink DCI or a downlink DCI. In some implementations, this indication field is DL/UL flag, which can be referred to as Identifier for DCI formats. For example, the value of this bit field is set to 0, indicating an UL DCI format, set to 1, indicating an DL DCI format.

Clause 13. The method of clause 6, wherein the second control information includes an indication field that indicates itself is an uplink DCI or a downlink DCI.

Clause 14. The method of clause 6, wherein the first control information is used for scheduling multicast or broadcast channels, and the second control information is used by every wireless device or a group of wireless devices.

Clause 15. The method of clause 6, wherein the first control information is used to indicate the information of CORESET or search space for the second control information.

Clause 16. The method of clause 6, wherein a scheduling offset between a physical downlink control channel (PDCCH) and a PDSCH is determined based on the first control information or the first PDSCH. In some implementations, the offset is determined based on the first control information. In one example, the first PDSCH indicates that the offset starts from the slot where the first control information located or the first PDSCH located.

Clause 17. The method of clause 6, wherein a scheduling offset between a PDCCH and a PUSCH in the second control information is determined based on the first control information or the first PDSCH.

Clause 18. The method of clause 7, wherein a size of the second control information is determined based on N or N−1, where N is a maximum number of cells configured for multi-cell scheduling.

Clause 19. The method of clause 8, wherein a size of the second control information is determined based on the number of cells indicated by the first control information within a maximum number of cells and with a maximum size of the number of cells.

Clause 20. The method of clause 9, wherein a size of the second control information is determined based on cells indicated by the first control information.

Clause 21. An apparatus for wireless communication comprising a processor that is configured to carry out the method of any of clauses 1 to 20.

Clause 22. A non-transitory computer readable medium having code stored thereon, the code when executed by a processor, causing the processor to implement a method recited in any of clauses 1 to 20.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:
   determining, by a wireless device, a size budget of a control information in a case that the control information includes multi-cell scheduling control information; and
   monitoring a plurality of control channels carrying the control information within the size budget,
   wherein the multi-cell scheduling control information includes a first control information for scheduling a first physical downlink shared channel (PDSCH) on one cell and a second control information that is in the first PDSCH to schedule at least one of other PDSCHs or physical uplink shared channels (PUSCHs) on one or more other cells, wherein the first control information includes an indication field for indicating whether the second control information is in the first PDSCH.

2. The method of claim 1, wherein the control information includes multiple downlink control information (DCI) formats, and wherein the DCI formats include a baseline DCI size budget that includes up to three different DCI sizes using cell radio network temporary identifier (C-RNTI) and up to four different DCI sizes using any RNTI.

3. The method of claim 2, wherein a DCI format of the multiple DCI formats used for multi-cell scheduling is included in the baseline DCI size budget, and wherein the size of multi-cell scheduling control information is not included in the up to three different DCI sizes using C-RNTI.

4. The method of claim 1, wherein the first control information further includes an indication field for indicating a number of cells corresponding to the second control information that is in the first PDSCH.

5. The method of claim 4, wherein a size of the second control information is determined based on the number of cells indicated by the first control information within a maximum number of cells and with a maximum size of the number of cells.

6. The method of claim 1, wherein the first control information further includes an indication field for indicating each cell index or a code point for a group of cells.

7. The method of claim 6, wherein a size of the second control information is determined based on cells indicated by the first control information.

8. The method of claim 1, wherein the second control information includes one or more shared indication fields for all scheduled cells or a group of scheduled cells.

9. The method of claim 1, wherein the second control information is present only when the first PDSCH is scheduled without downlink shared channel (DL-SCH) transmission.

10. The method of claim 1, wherein the second control information is uplink (UL) grant or downlink (DL) assignment, and wherein the first control information includes an indication field that indicates the second control information is an uplink DCI or a downlink DCI.

11. The method of claim 1, wherein the second control information includes an indication field that indicates the second control information is an uplink DCI or a downlink DCI.

12. The method of claim 1, wherein the first control information is used for scheduling multicast or broadcast channels, and the second control information is used by every wireless device in the one or more other cells or a group of wireless devices.

13. The method of claim 1, wherein the first control information is used to indicate the information of CORESET or search space for the second control information.

14. The method of claim 1, wherein a scheduling offset between a physical downlink control channel (PDCCH) and a PDSCH is determined based on the first control information or the first PDSCH.

15. The method of claim 1, wherein a scheduling offset between a PDCCH and a PUSCH in the second control information is determined based on the first control information or the first PDSCH.

16. The method of claim 1, wherein a size of the second control information is determined based on N or N−1, where N is a maximum number of cells configured for multi-cell scheduling.

17. An apparatus for wireless communication comprising one or more processors configured to carry out a method comprising:
   determining, by a wireless device, a size budget of a control information in a case that the control information includes multi-cell scheduling control information; and
   monitoring a plurality of control channels carrying the control information within the size budget,
   wherein the multi-cell scheduling control information includes a first control information for scheduling a first physical downlink shared channel (PDSCH) on one cell and a second control information that is in the first PDSCH to schedule at least one of other PDSCHs or physical uplink shared channels (PUSCHs) on one or more other cells, wherein the first control information includes an indication field for indicating whether the second control information is in the first PDSCH.

18. The apparatus of claim 17, wherein the control information includes multiple downlink control information (DCI) formats, and wherein the DCI formats include a baseline DCI size budget that includes up to three different DCI sizes using cell radio network temporary identifier (C-RNTI) and up to four different DCI sizes using any RNTI.

* * * * *